(12) United States Patent
Kim et al.

(10) Patent No.: US 7,254,344 B2
(45) Date of Patent: Aug. 7, 2007

(54) PASSIVE OPTICAL NETWORK USING LOOP BACK OF MULTI-WAVELENGTH LIGHT GENERATED AT CENTRAL OFFICE

(75) Inventors: Jong-Kwon Kim, Taejonkwangyok-shi (KR); Seong-Taek Hwang, Pyongtaek-shi (KR); Yun-Je Oh, Yongin-shi (KR)

(73) Assignee: Samsung Electronnics Co., Ltd., Suwon-Si, Gyeonggi-Do (KR)

( * ) Notice: Subject to any disclaimer, the term of this patent is extended or adjusted under 35 U.S.C. 154(b) by 723 days.

(21) Appl. No.: 10/427,284

(22) Filed: May 1, 2003

(65) Prior Publication Data
US 2004/0091265 A1    May 13, 2004

(30) Foreign Application Priority Data
Nov. 7, 2002    (KR) ............... 10-2002-0068846

(51) Int. Cl.
*H04B 10/00* (2006.01)
*H04J 14/00* (2006.01)

(52) U.S. Cl. ............... 398/179; 398/70; 398/71; 398/72

(58) Field of Classification Search ........... 398/170, 398/70, 71, 72
See application file for complete search history.

(56) References Cited

U.S. PATENT DOCUMENTS
2001/0004290 A1 *  6/2001  Lee et al. ............... 359/124
(Continued)

FOREIGN PATENT DOCUMENTS
JP    2001-177505    6/2001
JP    2002-118538    4/2002
(Continued)

OTHER PUBLICATIONS
"Wavelength-Division-Multiplexed Passive Optical Network Based on Spectrum-Slicing Techniques," IEEE Photonics Technology Letters, vol. 10 No. 9 Sep. 1998 to Jung et al.*

(Continued)

*Primary Examiner*—Kenneth Vanderpuye
*Assistant Examiner*—Ken Malkowski
(74) *Attorney, Agent, or Firm*—Cha & Reiter, LLC

(57) ABSTRACT

A passive optical network includes a central office and a subscriber-side apparatus connected with the central office through an optical fiber link. The subscriber-side apparatus performs communication with the central office based on wavelength-division-multiplexed optical signals. The central office has a routing section, provided with first to fourth multiplexing ports, for demultiplexing multi-wavelength light inputted from the fourth multiplexing port into a plurality of channels. Each of the demultiplexed channels is amplified and multiplexed for output through the first multiplexing port. Optical signals inputted through the third multiplexing port are demultiplexed and outputted upstream. The routing section also multiplexes channels for downstream optical signals, outputting the multiplexed channels through the second port. A splitting section, provided with first to third splitting ports and arranged on a loop optical waveguide connects the first and fourth multiplexing port with each other. The splitting section causes some of multi-wavelength light inputted into the first splitting port to be outputted through the second splitting port and causes the remainder of multi-wavelength light to be outputted through the third splitting port connected with the fourth multiplexing port. A circulator causes the multi-wavelength light inputted through the second splitting port to be transmitted to the subscriber-side apparatus and causes upstream optical signals received from the subscriber-side apparatus to be outputted to the third multiplexing port.

12 Claims, 7 Drawing Sheets

DTx:DOWNSTREAM TRANSMITTER, DRx:DOWNSTREAM RECEIVER, UTx:UPSTREAM TRANSMITTER, URx:UPSTREAM RECEIVER, MUX:MULTIPLEXER, DMUX:DEMULTIPLEXER

U.S. PATENT DOCUMENTS

2001/0012144 A1* 8/2001 Miyazaki et al. ............ 359/188
2001/0038733 A1* 11/2001 Cicchese et al. .............. 385/24
2002/0145775 A1* 10/2002 Effenberger et al. ........ 359/123
2003/0076560 A1* 4/2003 Pratt et al. ................... 359/125

OTHER PUBLICATIONS

"A low-cost WDM Source with an ASE Injected Fabry-Perot Semiconductor Laser," IEEE Photonics Technology Letters, col. 12 No. 8 Aug. 2000 to Kim et al.*

* cited by examiner

DTx:DOWNSTREAM TRANSMITTER, DRx:DOWNSTREAM RECEIVER, UTx:UPSTREAM TRANSMITTER, URx:UPSTREAM RECEIVER, MUX:MULTIPLEXER, DMUX:DEMULTIPLEXER

PASSIVE OPTICAL NETWORK USING LOOP BACK OF MULTI-WAVELENGTH LIGHT GENERATED AT CENTRAL OFFICE

CLAIM OF PRIORITY

This application claims priority to an application entitled "Passive Optical Network Using Loop Back of Multi-wavelength Generated at Central Office", filed in the Korean Industrial Property Office on Nov. 7, 2002 and assigned Serial No. 2002-68846, the contents of which are hereby incorporated by reference.

BACKGROUND OF THE INVENTION

1. Field of the Invention

The present invention relates to an optical communication system, and more particularly to a wavelength division multiplexing passive optical network.

2. Description of the Related Art

A wavelength division multiplexing (WDM) passive optical network distributes, optical signals downstream from a central office to each subscriber. The network uses at a remote node between the central office and the subscriber a passive element instead of an active element, such as an amplifier, a transmitter and so forth. Similarly, upstream optical signals together with data for the subscriber are sent through the passive element to the central office. In such a WDM passive optical network, both the central office and the remote node require an apparatus for multiplexing and/or demultiplexing upstream and downstream optical signals, and both the central office and the subscriber require a transmitter and a receiver.

A persistent attempt has been made in recent WDM passive optical networks to efficiently implement a multiplexer and a demultiplexer for use with an arrayed waveguide grating (AWG) and to economically implement a light source for transmission. In particular, much research has recently been published regarding a method for implementing the light source for transmission of the upstream optical signals in a simple and inexpensive manner, in which the light source is provided for the subscriber.

FIG. 1 illustrates construction of a conventional WDM passive optical network. This WDM passive optical network includes a central office 110 and a subscriber-side apparatus 130,140 connected with the central office 110 through optical fiber links 120, 125, respectively. Here, the subscriber-side apparatus includes a remote node 130 and a plurality of subscribers 140 connected with the remote node 130.

The central office 110 includes a plurality of optical transmitters 111, a plurality of optical receivers 114, a multiplexer 112 and a demultiplexer 113.

Each of the optical transmitters 111 outputs channels, which are modulated with the corresponding data signals and have different wavelengths. The optical transmitter 111, for example, makes much use of a distributed feedback laser diode (DFB LD) appropriate to downstream optical signals for transmission of high capacity data.

The multiplexer 112 multiplexes channels inputted from the transmitters 111 into downstream optical signals, and then transmits the multiplexed downstream optical signals through the optical fiber link 120. The multiplexer 112 may make use of a passive element such as a 1×N AWG, for example.

The demultiplexer 113 demultiplexes upstream optical signals received through the optical fiber link 125 into a plurality of channels, and then outputs the demultiplexed channels. The demultiplexer 113 may also make use of a passive element such as a 1×N AWG.

The optical receivers 114 convert each of the channels inputted from the demultiplexer 113 into an electrical signal. The optical receiver 114 makes use of a photodiode, for example.

The subscriber-side apparatus 130, 140 includes a demultiplexer 131, a multiplexer 132, a plurality of optical transmitters 142 and a plurality of optical receivers 141.

The demultiplexer 131 demultiplexes downstream optical signals received through the optical fiber link 120 into a plurality of channels, and then outputs the results.

The optical receivers 141 convert each of the channels inputted from the demultiplexer 131 into an electrical signal.

The optical transmitters 142 each output a plurality of channels, which are modulated with the corresponding data signals and have different wavelengths. The optical transmitter 142, for example, makes much use of either a spectrum-sliced light source appropriate to upstream optical signals for transmission of relatively low capacity data or a light source for generating only a single mode by locking a multi-mode laser diode.

The multiplexer 132 multiplexes a plurality of channels inputted from the transmitters 142 into upstream optical signals, and then transmits the multiplexed upstream optical signals through the optical fiber link 125.

However, the conventional WDM passive optical network has a problem in that transmission of a high volume of optical signals caused by a sharp growth in volume of the upstream optical signals, when either the spectrum-sliced light source or the light source for generating only a single mode by locking a multi-mode laser diode is used as a light source for transmitting upstream optical signals, makes operation of the network impossible or causes a transmission error rate to increase rapidly. As a further problem, costs for constructing the subscriber-side apparatus are increased when a single mode laser diode such as the DFB LD is used as a light source for transmitting upstream optical signals.

SUMMARY OF THE INVENTION

The present invention is directed to solving the above-mentioned problems occurring in the prior art. The present invention provides a wavelength division multiplexing (WDM) passive optical network capable not only of efficiently containing upstream optical signals in spite of an increase in transmission capacity of the upstream optical signals, but also of saving the costs for constructing the subscriber-side apparatus.

More specifically, the present invention provides a passive optical network including a central office and a subscriber-side apparatus connected with the central office through an optical fiber link, in which the subscriber-side apparatus performs communication with the central office based on wavelength-division-multiplexed optical signals, the central office comprising: a routing section, provided with first to fourth multiplexing ports, for demultiplexing multi-wavelength light inputted through the fourth multiplexing port into a plurality of channels, for amplifying and multiplexing each of these demultiplexed channels, for outputting the results through the first multiplexing port, for demultiplexing and outputting upstream optical signals inputted through the third multiplexing port, for multiplexing channels for downstream optical signals and for outputting the multiplexed channels through the second multiplexing port; a splitting section, provided with first to third splitting ports and arranged on a loop optical waveguide connecting the first and fourth multiplexing port with each other, for causing some of multi-wavelength light inputted into the first splitting port to be outputted through the second splitting port, and for causing the remaining portion of the multi-wavelength light to be outputted through the third splitting port connected with the fourth multiplexing port; a circulator for causing the multi-wavelength light inputted from the second splitting port to be transmitted to the subscriber-side apparatus, and for causing upstream optical signals received from the subscriber-side apparatus to be outputted to the third multiplexing port.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings.

Figure 1:
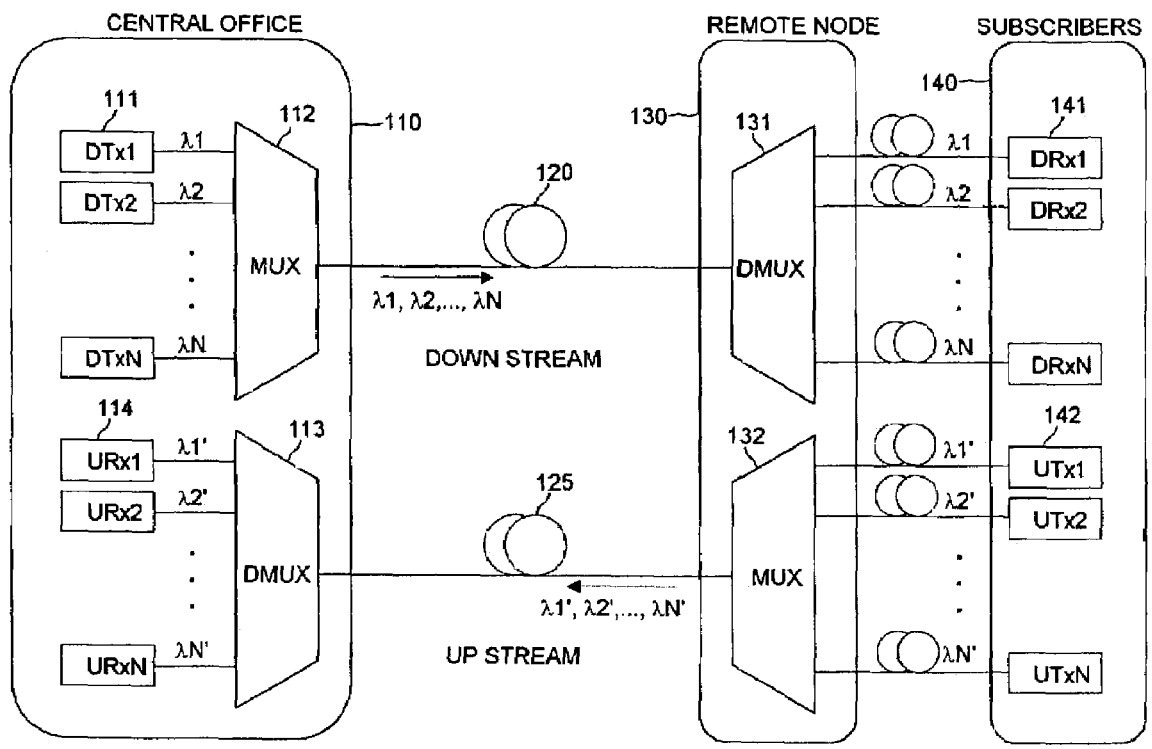
FIG. 1 illustrates construction of a conventional WDM passive optical network.
Figure 2:
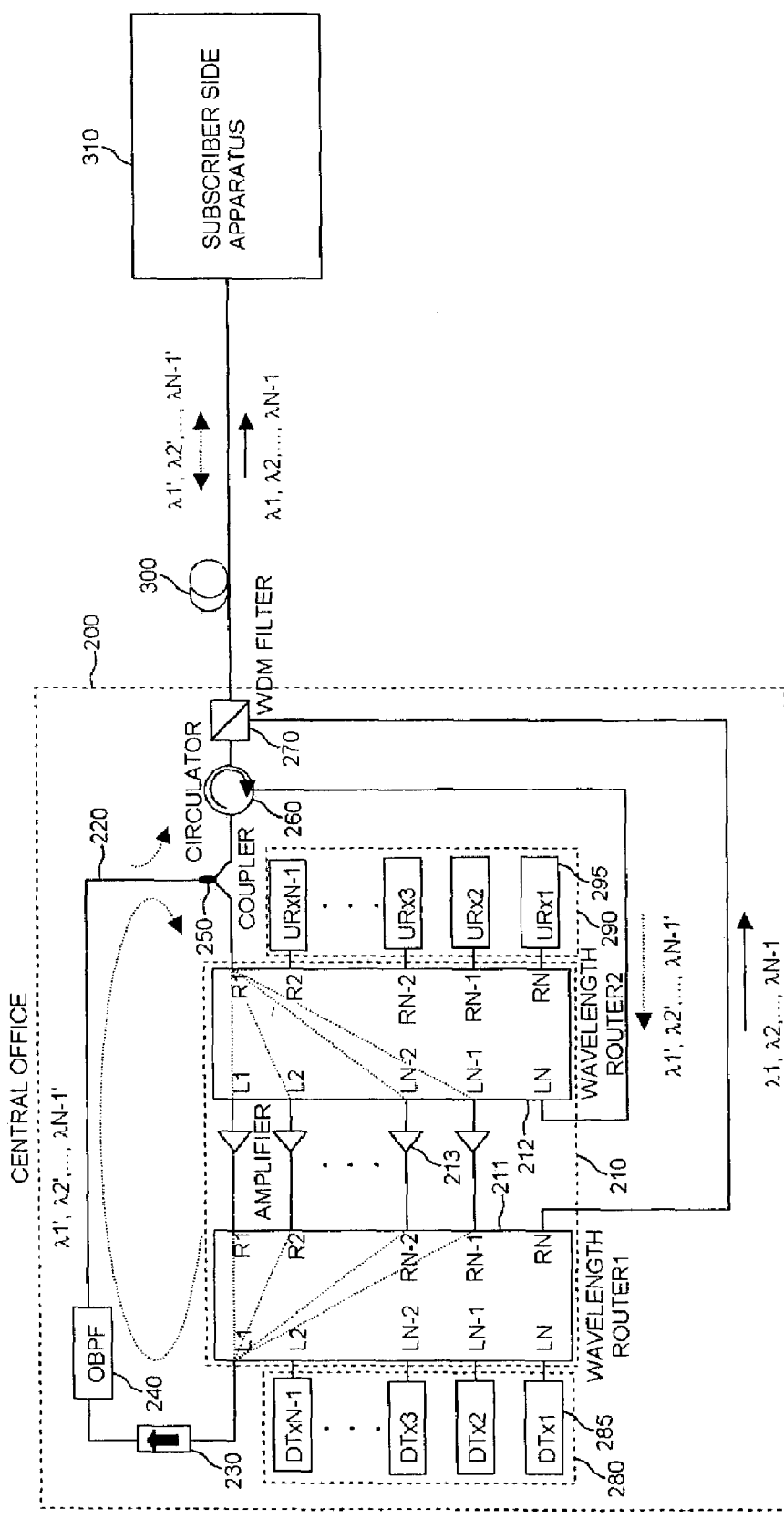
FIG. 2 illustrates construction of a wavelength division multiplexing (WDM) passive optical network according to the present invention.

FIG. 2 illustrates construction of a wavelength division multiplexing (WDM) passive optical network according to the present invention. The passive optical network includes a central office 200 and a subscriber-side apparatus 310, in which the subscriber-side apparatus 310 is connected with the central office 200 through an optical fiber link 300 and performs communication with the central office 200 based on wavelength-division-multiplexed optical signals.

The central office 200 transmits downstream optical signals, which are modulated with multi-wavelength light and data signals, to the subscriber-side apparatus 310, and receives upstream optical signals from the subscriber-side apparatus 310. The subscriber-side apparatus 310 receives multi-wavelength light and the downstream optical signals from the central office 200, demultiplexes the multi-wavelength light into a plurality of channels, modulates each of the channels into data signals, multiplexes the modulated channels into upstream optical signals, and transmits the multiplexed upstream optical signals to the central office 200.

The central office 200 includes a routing section 210, a splitting section 250, a circulator 260, a combining section 270, an optical transmitting section 280, an optical receiving section 290, an isolator 230, and an optical band pass filter (OBPF) 240.

The routing section 210 includes first and second wavelength routers 211 and 212, and a plurality of optical amplifiers 213.

The second wavelength router 212 comprises third and fourth multiplexing ports LN and R1, and third and fourth demultiplexing multi-ports $L_1$ to $L_{N-1}$ and $R_2$ to $R_N$. The second wavelength router 212 demultiplexes multi-wavelength light, inputted from the fourth multiplexing port $R_1$, into a plurality of channels, and then outputs the demultiplexed channels through the third demultiplexing multi-ports $L_1$ to $L_{N-1}$. Further, the second wavelength router 212 demultiplexes upstream optical signals, inputted from the third multiplexing port $L_N$, into a plurality of channels, and then outputs the demultiplexed channels through the fourth demultiplexing multi-ports $R_2$ to $R_N$. The second wavelength router 212 may, for example, make use of an element that has a periodicity like an N×N arrayed waveguide grating and performs multiplexing and demultiplexing in both directions.

The optical amplifiers 213 are connected with the corresponding third demultiplexing multi-ports $L_1$ to $L_{N-1}$ and cause channels inputted from these ports to be amplified and outputted. Further, the optical amplifiers 213 functions as a light source for multi-wavelength light. Amplified spontaneous emission (ASE) generated from each optical amplifier 213 turns to multi-wavelength light after it is sequentially subjected to filtering, amplification, and so forth, and then is transmitted to the subscriber-side apparatus 310 as multi-wavelength light. Each of the optical amplifiers 213 includes an erbium doped fiber (EDF) and a pumping light source for supplying pumping light by means of the EDF.

The first wavelength router 211 comprises first and second multiplexing ports L1 and RN, and first and second demultiplexing multi-ports $L_2$ to $L_N$ and $R_1$ to $R_{N-1}$. The first wavelength router 211 multiplexes the amplified channels inputted into the second demultiplexing multi-ports $R_1$ to $R_{N-1}$, and then outputs the multiplexed channels through the first multiplexing port $L_1$. Further, the first wavelength router 211 multiplexes channels inputted into the first demultiplexing multi-ports $L_2$ to $L_N$, and then outputs the multiplexed channels through the second multiplexing port $R_N$. The first wavelength router 211 may, for example, make use of an element that has a periodicity like an N×N arrayed waveguide grating and performs multiplexing and demultiplexing in both directions.

Both the first multiplexing port $L_1$ of the first wavelength router 211 and the fourth multiplexing port $R_1$ of the second wavelength router 212 are connected with each other by an optical waveguide, thus forming a loop optical waveguide 220. That is, ASE generated from the plurality of optical amplifiers 213 in the beginning is outputted through the first multiplexing port $L_1$, filtered to become multi-wavelength light, and then inputted into the fourth multiplexing port $R_1$ as multi-wavelength light. Thereafter, the multi-wavelength light is multiplexed into a plurality of channels by the second wavelength router 212, and then inputted into the plurality of optical amplifiers 213 again. The plurality of optical amplifiers 213 carry out amplification and output of the inputted channels. The amplified channels are outputted through the first multiplexing port $L_1$ again. This process is endlessly repeated by the loop optical waveguide 220. In this manner, the endlessly repeated ASE is subjected to lasing, and thus the lased ASE can be used as multi-wavelength light in the passive optical network. This generated multi-wavelength light is modulated at the subscriber-side apparatus 310, but not by data signals. Further, a lasing direction of the ASE is selected in a direction opposite to that of multiplexing or demultiplexing for transmitting or receiving the modulated optical signals, so that it is possible to block crosstalk, which may be generated through the first and second wavelength routers 211, 212.

The isolator 230 is arranged on the loop optical waveguide 220. The isolator 230 allows for passing through inputted multi-wavelength light, but it does not allow for passing through light traveling in a direction opposite to the inputted multi-wavelength light.

The OBPF 240 is arranged on the loop optical waveguide 220, and determines a wavelength band of the multi-wavelength light based on the pre-set wavelength band. The OBPF 240 may make use of a multiplayer thin film filter with a plurality of thin films deposited, for example.

The splitting section 250 is provided with first to third ports, and arranged on the loop optical waveguide 220. The splitting section 250 outputs a part of multi-wavelength light inputted into the first port through the second port, and outputs the remaining portion through the third port, which is connected with the fourth multiplexing port R1 of the second wavelength router 212. The splitting section 250 may make use of a 1×2 optical coupler such as a Y-branch coupler, for example.

The circulator 260 is provided with first to third ports. The circulator 260 allows multi-wavelength light inputted from the splitting section into the first port and downstream optical signals to be transmitted to the subscriber-side apparatus 310 and allows upstream optical signals received from the subscriber-side apparatus 310 into the second port to be outputted through the third port, which is connected with the third multiplexing port $L_N$ of the second wavelength router 212.

The combining section 270 is provided with first to third ports. The combining section 270 passes through upstream optical signals received from the subscriber-side apparatus 310 into the second port, but it combines multi-wavelength light inputted from the circulator 260 to the first port with downstream optical signals inputted into the third port, which is connected with the second multiplexing port $R_N$ of the first wavelength router 211, and then transmits the combined results to the subscriber-side apparatus 310. The combining section 270, for example, may make use of a WDM filter.

The optical transmitting section 280 includes a plurality of optical transmitters 285 which are connected respectively with the first demultiplexing multi-ports $L_2$ to $L_N$ of the first wavelength router 211 in a one-to-one correspondence. The channels of different wavelengths outputted from the plurality of optical transmitters 285 are inputted into the first demultiplexing multi-ports $L_2$ to $L_N$ of the first wavelength router 211. The optical transmitter 285 may, for example, make use of a DFB laser diode appropriate to the downstream optical signals for transmission of high capacity data.

The optical receiving section 290 includes a plurality of optical receivers 295 which are connected respectively with the fourth demultiplexing multi-ports $R_2$ to $R_N$ of the second wavelength router 212 in a one-to-one correspondence, and converts a plurality of channels inputted through the fourth demultiplexing multi-ports $R_2$ to $R_N$ into a separate electrical signal. The optical receiver 295 may make use of a photodiode, for example.

The subscriber-side apparatus 310 receives the multi-wavelength light and downstream optical signals from the central office 200, demultiplexes the multi-wavelength light into a plurality of channels, modulates the plurality of channels into the corresponding separate data signals, multiplexes the modulated channels into upstream optical signals, and then transmits the multiplexed upstream optical signals to the central office 200. The multi-wavelength light is suitable to transmit a high volume of modulated data, because the multi-wavelength light is laser light.

Figure 3:
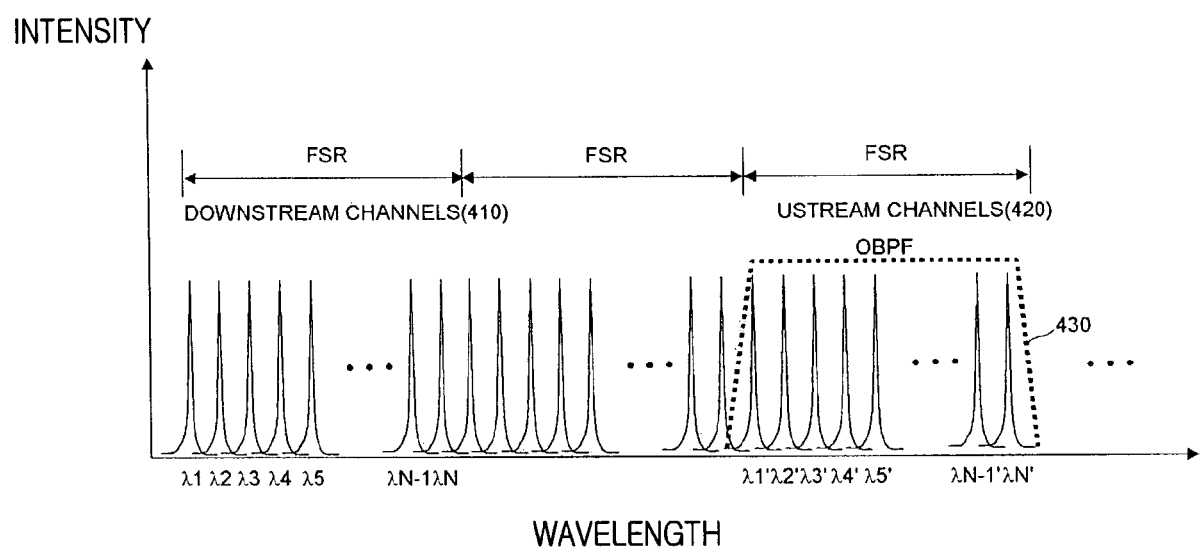
FIG. 3 shows a wavelength band used in the WDM passive optical network shown in FIG. 2.

FIG. 3 shows a wavelength band used in the WDM passive optical network shown in FIG. 2. The first and second wavelength routers 211, 212 have the same free spectral range (FSR), and set a wavelength band 410 of the downstream optical signals on the FSR. Further, the routers 211, 212 are designed so that, when a wavelength band 420 of the multi-wavelength light is set to be different from the wavelength band 410 of the downstream optical signals, the optical signals of the two bands are adapted to be transmitted at the same time. A pass band 430 of the OBPF 240 is set to be an integer times the FSR, which is a repetition period of the band. The multi-wavelength light has the same wavelength band as the upstream optical signals.

Figure 4:
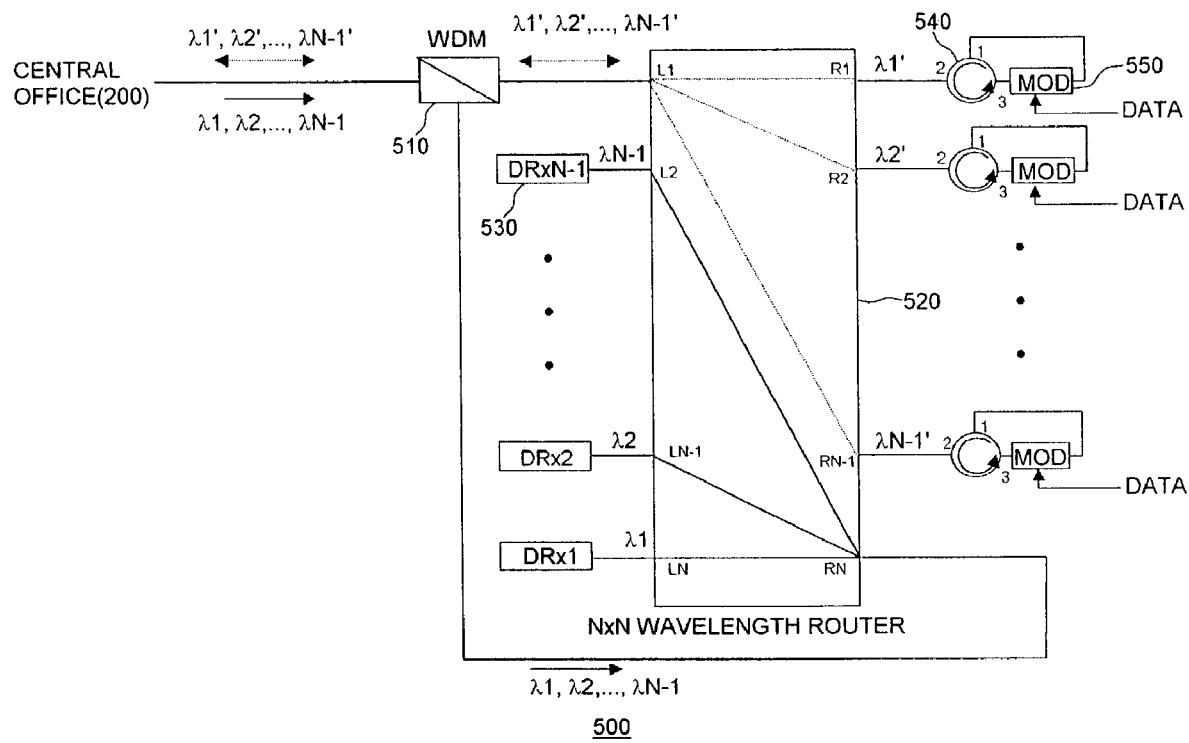
FIG. 4 illustrates construction of a subscriber-side apparatus according to a first embodiment of the present invention.

FIG. 4 illustrates construction of a subscriber-side apparatus according to a first embodiment of the present invention. The subscriber-side apparatus 500 includes a WDM filter 510, a wavelength router 520, a plurality of optical receivers 530, a plurality of circulators 540, and a plurality of modulators 550.

The WDM filter 510 is provided with first to third ports. The WDM filter 510 allows the multi-wavelength light and downstream optical signals from the central office 200 to be received through the first port, in which the multi-wavelength light is outputted through the second port and the downstream optical signals are outputted through the third port. Further, the WDM filter allows the upstream optical signals inputted through the second port to be transmitted through the first port to the central office 200.

The wavelength router 520 comprises first and second multiplexing ports $L_1$ and $R_N$, and first and second demultiplexing multi-ports $L_2$ to $L_N$ and $R_1$ to $R_{N-1}$. The wavelength router 520 demultiplexes the multi-wavelength light inputted through the first multiplexing port $L_1$ into a plurality of channels, and then outputs the demultiplexed channels to the second demultiplexing multi-ports $R_1$ to $R_{N-1}$. Further, the wavelength router 520 demultiplexes the downstream optical signals inputted through the second multiplexing port $R_N$ into a plurality of channels, and then outputs the demultiplexed channels to the first demultiplexing multi-ports $L_2$ to $L_N$. The wavelength router 520 may, for example, make use of an element which has a periodicity like an N×N arrayed waveguide grating and performs multiplexing and demultiplexing in both directions.

The plurality of optical receivers 530 are connected with the first demultiplexing multi-ports $L_2$ to $L_N$ respectively, in a one-to-one correspondence and convert a plurality of channels outputted through the first demultiplexing multi-ports $L_2$ to $L_N$ into a separate electrical signal. The optical receiver 530 may make use of a photodiode, for example.

The plurality of circulators 540 are connected with the second demultiplexing multi-ports $R_1$ to $R_{N-1}$ respectively, in a one-to-one correspondence, and are provided with first to third ports. Each of the circulators 540 outputs channels inputted through the second port to the third port and outputs channels inputted through the first port to the second port.

The plurality of modulators 550 are connected with the plurality of circulators 540 respectively, in a one-to-one correspondence. Each of the modulators 550 causes channels inputted through the third port of each corresponding circulator 540 to be modulated with the corresponding data signal and to be outputted to the first port of the circulator 540.

Figure 5:
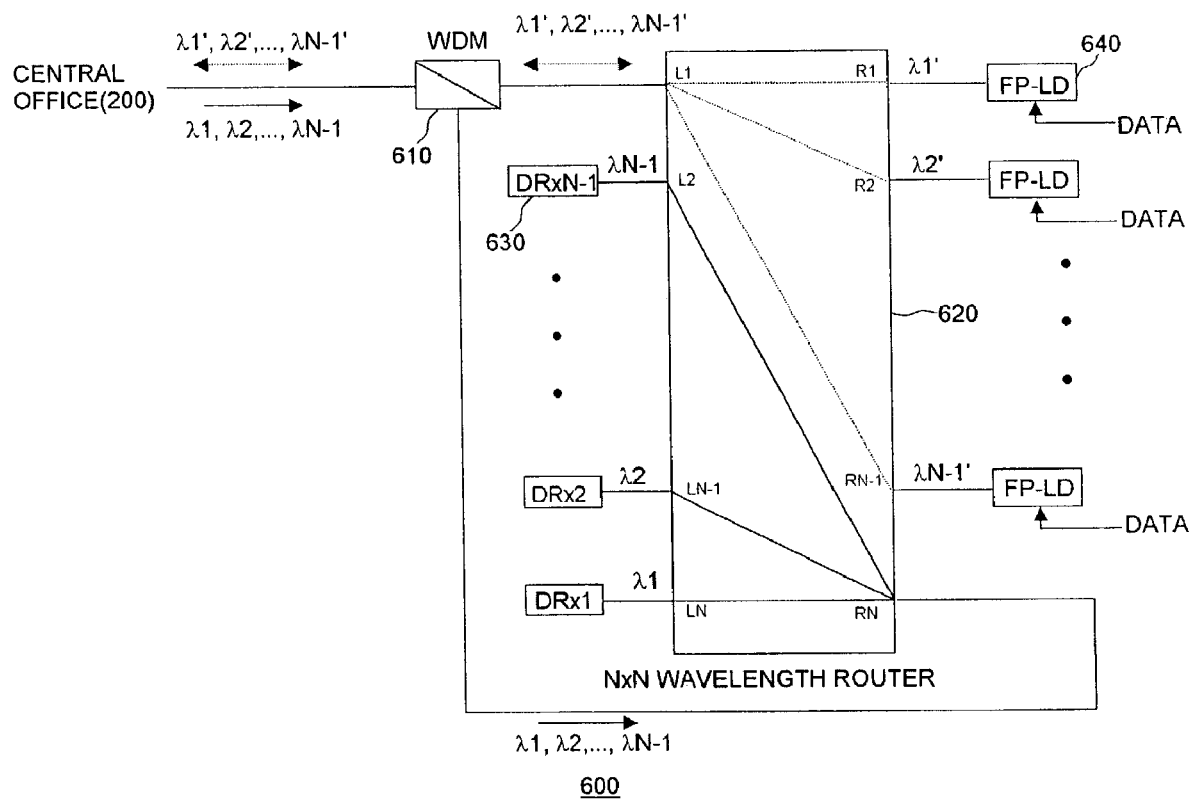
FIG. 5 illustrates construction of a subscriber-side apparatus according to a second embodiment of the present invention.

FIG. 5 illustrates construction of a subscriber-side apparatus according to a second embodiment of the present invention. The subscriber-side apparatus 600 includes a WDM filter 610, a wavelength router 620, a plurality of optical receivers 630, and a plurality of Fabry-Perot laser diodes 640. The FIG. 5 embodiment differs from that of FIG. 4 in that Fabry-Perot laser diodes 640 are used in place of the combination of circulators 540 and modulators 550. Therefore, analogous parts of the description will not be repeated herein.

The plurality of Fabry-Perot laser diodes 640 are respectively connected with the second demultiplexing multi-ports $R_1$ to $R_{N-1}$ of the wavelength router 620 in a one-to-one correspondence. The Fabry-Perot laser diodes 640 are self-locked by inputted respective channels, causing each channel of the self-locked wavelengths to be modulated with the corresponding data signal before being outputted. A prior art method spectrum-slices non-coherent ASE and then injects the spectrum-sliced results into a Fabry-Perot laser diode, thereby locking a multi-mode of the Fabry-Perot laser diode to a single mode. However, this method requires a specialized technology, because it demands a high power of ASE and a narrow bandwidth of spliced spectrum. On the contrary, when multi-wavelength light generated from the central office 200 is used, light of a relatively high power and a relatively narrow bandwidth can be inputted into the plurality of Fabry-Perot laser diodes 640. Therefore, locking efficiency and locking stability can be obtained.

Figure 6:
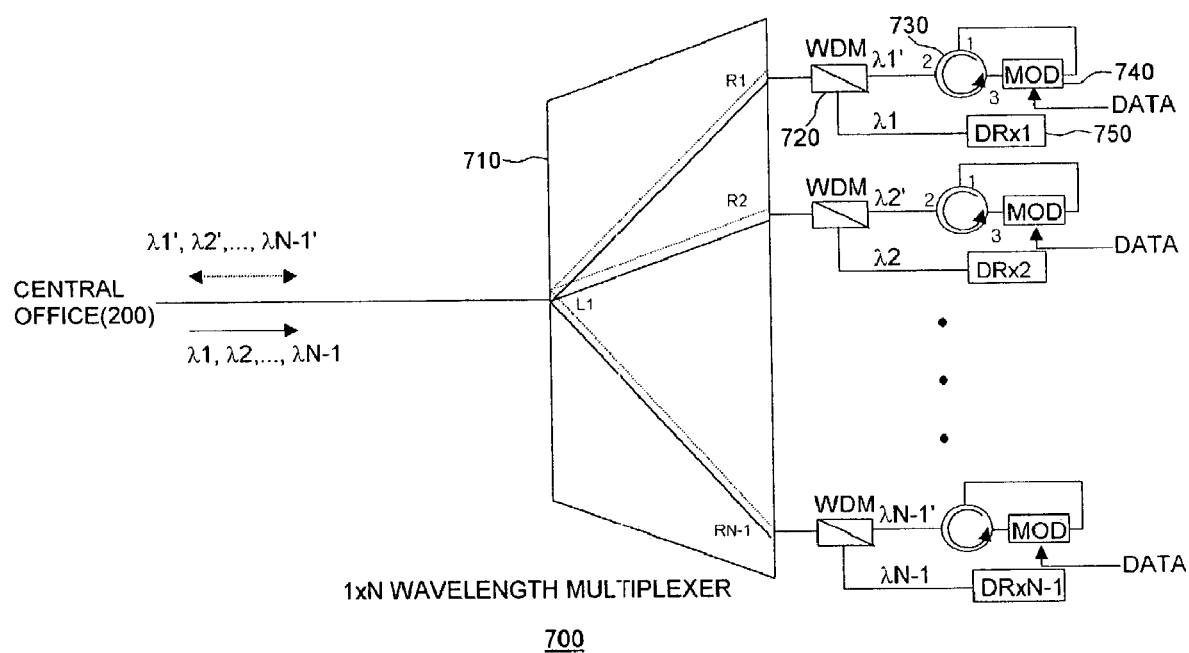
FIG. 6 illustrates construction of a subscriber-side apparatus according to a third embodiment of the present invention.

FIG. 6 illustrates construction of a subscriber-side apparatus according to a third embodiment of the present invention. The subscriber-side apparatus 700 includes a wavelength division multiplexer 710, a plurality of WDM filters 720, a plurality of optical receivers 750, a plurality of circulators 730, and a plurality of modulators 740.

The wavelength division multiplexer 710 comprises a single multiplexing port $L_1$ and a plurality of demultiplexing ports $R_1$ to $R_{N-1}$. The wavelength division multiplexer 710 demultiplexes inputted respective multi-wavelength light and downstream optical signals into a plurality of channels and then outputs the demultiplexed channels to the plurality of demultiplexing ports $R_1$ to $R_{N-1}$ or otherwise multiplexes channels inputted through the plurality of demultiplexing ports $R_1$ to $R_{N-1}$, and then transmits the multiplexed channels to the central office 200.

The plurality of WDM filters 720 are connected with the plurality of demultiplexing ports $R_1$ to $R_{N-1}$, respectively, in a one-to-one correspondence, and are provided with first to third ports. In each WDM filter 720, of channels inputted through the first port, those constituting the multi-wavelength light are outputted through the second port and those constituting the downstream optical signals are outputted through the third port. Further, channels inputted through the second port are outputted to the first port.

The plurality of circulators 730 are connected with the plurality of WDM filters 720 respectively, in a one-to one correspondence, and are provided with first to third ports. Each of the circulators 730 outputs to the third port the channels having been inputted through the second port and outputs to the second port the channels having been inputted through the first port.

The plurality of modulators 740 are connected with the plurality of circulators 730 respectively, in a one-to-one correspondence. Each of the modulators 740 causes channels inputted through the third port of each corresponding circulator 730 to be modulated with the corresponding data signal, and then outputs the modulated channels to the first port of the circulator 730.

The plurality of optical receivers 750 are connected with the plurality of WDM filters 720 in a one-to-one correspondence. Each of the optical receivers 750 converts channels inputted through the third port of each corresponding WDM filter 720 into a separate electrical signal. The optical receiver 750 may make use of a photodiode, for example.

Figure 7:
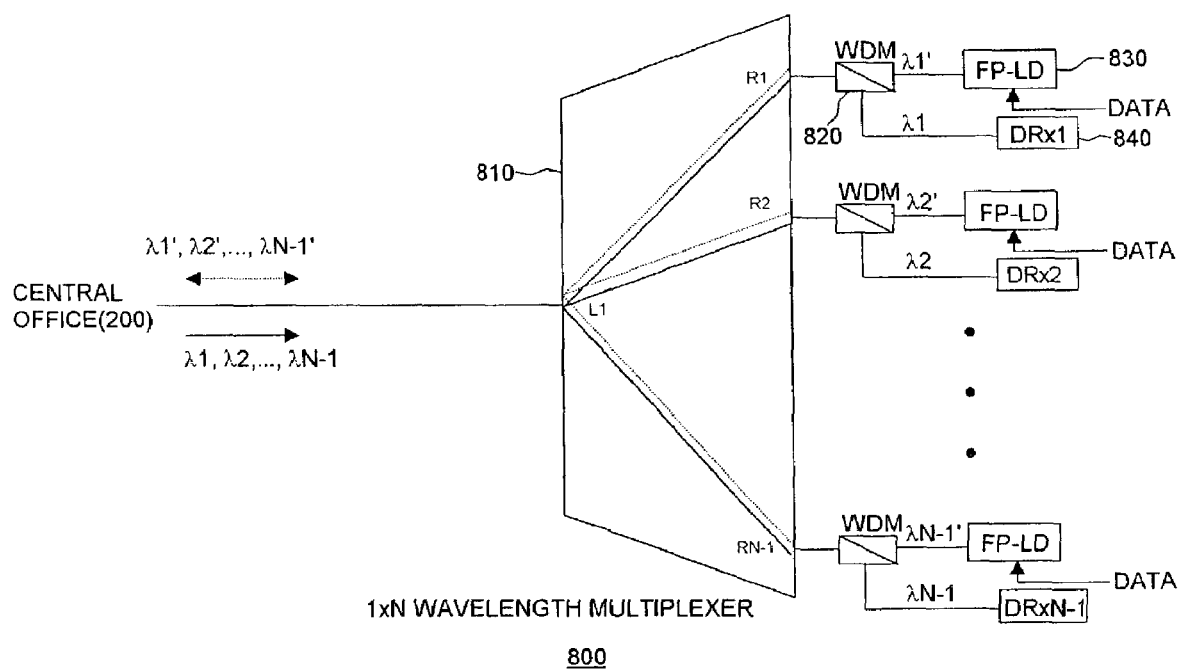
FIG. 7 illustrates construction of a subscriber-side apparatus according to a fourth embodiment of the present invention.

FIG. 7 illustrates construction of a subscriber-side apparatus according to a fourth embodiment of the present invention. The subscriber-side apparatus 800 includes a wavelength division multiplexer 810, a plurality of WDM filters 820, a plurality of optical receivers 840, and a plurality of Fabry-Perot laser diodes 830. The FIG. 7 embodiment differs from that of FIG. 6 only in that Fabry-Perot laser diodes 830 are used in place of the combination of circulators 730 and modulators 740. Therefore, corresponding parts of the description will not be repeated herein.

The plurality of Fabry-Perot laser diodes 830 are connected with the plurality of WDM filters 820 respectively, in a one-to-one correspondence. As the Fabry-Perot laser diodes 830 are self-locked by channels inputted through the second port of each corresponding WDM filter 820, the laser diodes 830 cause each channel of the self-locked wavelengths to be modulated with the corresponding data signal and then outputs the modulated channels.

As seen from the foregoing, the WDM passive optical network using a loop back of multi-wavelength light generated from the central office in accordance with the present invention has advantages in that the multi-wavelength light for upstream optical signals to be transmitted from subscribers is generated at the central office and then supplied to the subscribers, so that the optical network can be efficiently operated, and cost effectiveness can be obtained in proportion to the increase in number of subscribers. As an additional advantage, use of laser light as the multi wavelength light provides the optical network with a large enough capability to contain a high volume of data for the subscribers.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A passive optical network including a central office and at least one subscriber-side apparatus connected with the central office through an optical fiber link for communication upstream from the subscriber-side apparatus to the central office and downstream from the central office to the subscriber-side apparatus, in which the subscriber-side apparatus performs communication with the central office based on wavelength-division-multiplexed optical signals, the central office comprising:

a routing section, provided with first to fourth multiplexing ports, for demultiplexing multi-wavelength light inputted through the fourth multiplexing port into a plurality of channels, for amplifying and multiplexing each of the demultiplexed channels, for outputting the results through the first multiplexing port, for demultiplexing and outputting upstream optical signals inputted through the third multiplexing port, for multiplexing channels of downstream optical signals and for outputting the multiplexed channels through the second multiplexing port;

a splitting section, provided with first to third splitting ports and arranged on a loop optical waveguide connecting the first and fourth multiplexing port with each other, for causing some of multi-wavelength light inputted into the first splitting port to be outputted through the second splitting port and for causing the remaining portion of multi-wavelength light to be outputted through the third splitting port connected with the fourth multiplexing port;

a circulator for causing the multi-wavelength light inputted from the second splitting port to be transmitted to the subscriber-side apparatus and for causing upstream optical signals received from the subscriber-side apparatus to be outputted to the third multiplexing port.

2. A passive optical network according to claim 1, wherein the central office further comprises:

a combining section for causing the upstream optical signals received from the subscriber-side apparatus to be outputted to the circulator, combining the multi-wavelength light inputted from the circulator with the downstream optical signals inputted from the second multiplexing port, and transmitting the combined results to the subscriber-side apparatus; and an optical transmitting section for outputting channels of different wavelengths to the routing section.

3. A passive optical network according to claim. 1, wherein the central office further comprises an optical, receiving section for causing each of the channels demultiplexed from, said upstream optical signals inputted through the third multiplexing port to be converted into an electrical signal.

4. A passive optical network according to claim 1, wherein the central office further comprises:

an isolator, arranged on the loop optical waveguide, for passing through inputted multi-wavelength light and for blocking light traveling in a direction opposite to the inputted multi-wavelength light; and an optical band pass filter arranged on the loop optical waveguide and having at least one preset wavelength bandwidth.

5. A passive optical network according to claim 1, wherein the routing section comprises:

a second wavelength router having third and fourth demultiplexing multi-ports and said third and fourth multiplexing ports, said second wavelength router being configured for said demultiplexing of multi-wavelength light inputted from the fourth multiplexing port into a plurality of channels for output through the third demultiplexing multi-ports and for said demultiplexing of upstream optical signals inputted from the third multiplexing port into a plurality of channels for output through the fourth demultiplexing multi-ports;

a plurality of optical amplifiers, connected with the third demultiplexing multi-ports, for amplifying and outputting inputted channels; and a first wavelength router provided hi-st and second multiplexing ports and first and second demultiplexing multi-ports and configured For receiving the amplified channels as input into the second demultiplexing multi-ports, for multiplexing and outputting said received channels through said first multiplexing port and for multiplexing channels inputted into said first demultiplexing multi-ports for output through said second multiplexing port.

6. A method for optical communication between a central office and at least one subscriber-side apparatus connected with the central office for communication upstream from the subscriber-side apparatus to the central office and downstream from the central office to the subscriber-side apparatus including the steps of:

in a routing section provided with first to fourth multiplexing ports, demultiplexing multi-wavelength light inputted through the fourth multiplexing port into a plurality of channels, amplifying and multiplexing each of the demultiplexed channels, outputting the results through the first multiplexing port, demultiplexing and outputting upstream optical signals inputted through the third multiplexing port, multiplexing channels of downstream optical signals and outputting the multiplexed channels through the second multiplexing port;

in a splitting section provided with first to third splitting ports and arranged on a loop optical waveguide connecting the first and fourth multiplexing port with each other, outputting through the second splitting port some of multi-wavelength light inputted into the first splitting port and outputting through the third splitting port connected with the fourth multiplexing port the remaining portion of multi-wavelength light;

transmitting to the subscriber-side apparatus the multi-wavelength light inputted from the second splitting port; and outputting to the third multiplexing port upstream optical signals received from the subscriber-side apparatus.

7. The method according to claim 6, further comprising the steps of:

outputting the upstream optical signals received from the subscriber-side apparatus to a circulator, combining the multi-wavelength light inputted from the circulator with the downstream optical signals inputted from the second multiplexing port, and transmitting the combined results to the subscriber-side apparatus; and outputting, to the routing section, channels of different wavelengths.

8. The method according to claim 6, further comprising the step of converting into an electrical signal each of the channels demultiplexed from said upstream optical signals inputted through the third multiplexing port.

9. The method according to claim 6, further comprising the steps of:

passing through the loop optical waveguide inputted multi-wavelength light;

blocking light traveling in a direction opposite to the inputted multi-wavelength light; and optical band pass filtering, based on at least one preset wavelength, multi-wavelength light inputted into the loop optical waveguide.

10. The method according to claim 6, further comprising the steps of:

in a second wavelength router having third and fourth demultiplexing multi-ports and said third arid fourth multiplexing ports, utilizing said second wavelength router for said demultiplexing of multi-wavelength, light inputted from the fourth multiplexing port into a plurality of channels for output through the third demultiplexing multi-ports and for said demultiplexing of upstream optical signals inputted from the third multiplexing part into a plurality of channels for output through the fourth demultiplexing multi-ports.

11. The method according to claim 10, further comprising the steps of amplifying and outputting inputted channels by means of a plurality of optical amplifiers connected with the third demultiplexing multi-ports.

12. The method according to claim 11, further comprising the step of providing a first wavelength router with first and second multiplexing ports and first and second demultiplexing multi-pans configured for receiving the amplified channels as input into the second demultiplexing multi-ports and for multiplexing and outputting said received channels through said first multiplexing port and for multiplexing channels inputted into said first demultiplexing multi-ports for output through said second multiplexing port.

* * * * *

UNITED STATES PATENT AND TRADEMARK OFFICE
CERTIFICATE OF CORRECTION

| | | |
|---|---|---|
| PATENT NO. | : 7,254,344 B2 | Page 1 of 1 |
| APPLICATION NO. | : 10/427284 | |
| DATED | : August 7, 2007 | |
| INVENTOR(S) | : Jong-Kwon Kim et al. | |

It is certified that error appears in the above-identified patent and that said Letters Patent is hereby corrected as shown below:

On The
Title Page
Item [73], Assignee, should read as follows:

--Electronics.--

Signed and Sealed this

Twenty-third Day of October, 2007

JON W. DUDAS
*Director of the United States Patent and Trademark Office*